June 29, 1965     G. A. WATTS     3,191,944
REMOTE CONTROLLED SEED SPREADER
Filed May 27, 1964
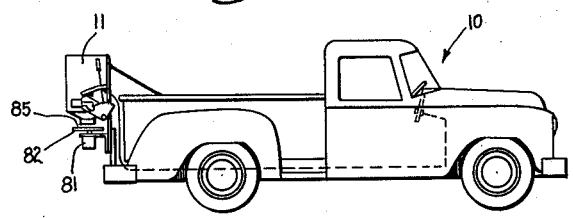
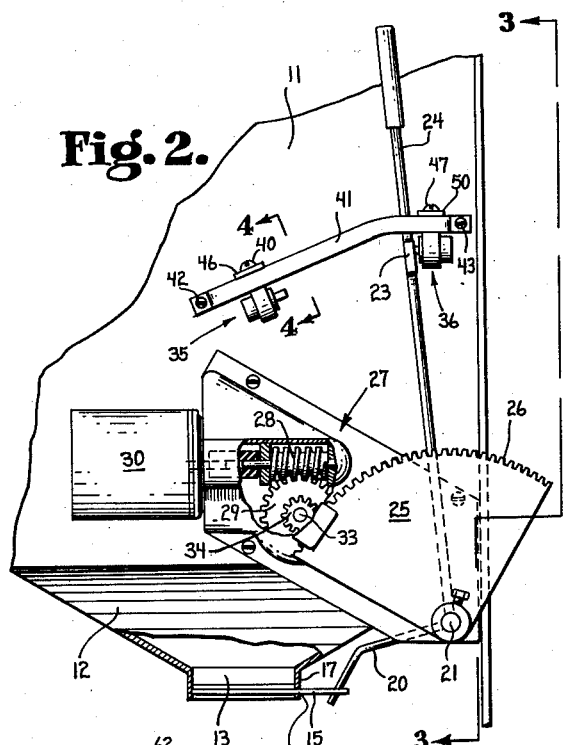
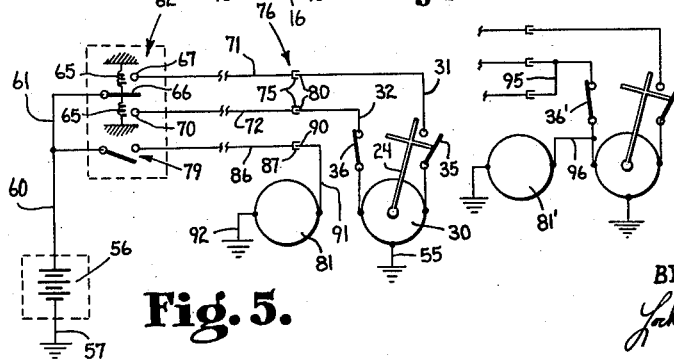
INVENTOR.
GUY A. WATTS
BY
*Jackwood, Woodard, Smith & Weikart*
Attorneys United States Patent Office 3,191,944
Patented June 29, 1965

3,191,944
REMOTE CONTROLLED SEED SPREADER
Guy A. Watts, R.R. 2, Farmersburg, Ind.
Filed May 27, 1964, Ser. No. 370,614
5 Claims. (Cl. 275—8)

The present invention relates to apparatus for spreading seed.

In the present day operation of farms, it is frequently true that a farmer will be planting a number of fields which are located remotely from one another so that he must travel on the road or highway from one field to another. Unless rapid transport means is provided, good work time is lost enroute from one field to the other. Also, while a respective field is being planted, it is desirable that the planting device be capable of planting the field as rapidly as possible, without waste of seed at the opposite ends of the field.

Consequently, one object of the present invention is to provide apparatus for spreading seed as rapidly as possible without waste of seed.

Still another object of the invention is to provide a seed spreader which can be controlled entirely remotely.

Related objects and advantages will become apparent as the description proceeds.

One embodiment of the present invention might include a seed spreader apparatus comprising a truck, a hopper mounted on said truck, a first electrical motor fixed to said hopper, a first plate mounted on the shaft of said motor in a horizontal position with radially extending ribs on the upper surface thereof, said hopper having a lower opening positioned above said first plate, a second plate mounted on said hopper and reciprocal to open and close said opening, a shaft rotatably mounted on said hopper, a lever fixed to said shaft and operatively engaging said second plate for reciprocation thereof, a hand lever fixed to said shaft and swingable to pivot said shaft for reciprocation of said second plate to open or close said opening, a second reversible electrical motor fixed to said hopper, a sector-shaped element fixed at its axis to said shaft, said sector-shaped element having gear teeth at its external periphery, speed reduction gearing coupling said motor and said gear teeth for pivoting said shaft at a reduced speed relative to said motor, a bracket bar fixed in spaced relation to the side wall of said hopper and overlying said hand lever, a pair of limit switches positioned on opposite sides of said hand lever with the actuating arms of the limit switches facing toward said hand lever for engagement by said hand lever at the opposite ends of its travel, said switches each being adjustably fixed against said bracket bar and hopper by a screw extending between said bar and hopper, a first circuit for operating said first electrical motor, a second circuit for operating said second electrical motor, a double throw single pole switch in said second circuit and located in the cab of said truck, spring means normally maintaining said switch between said throws, a pair of lines connecting said reversible motor and said switch whereby said switch may be closed against one throw or the other to operate said reversible motor in one direction or the other, said limit switches each controlling a respective one of said lines to limit travel of said second plate to a desired closed, partially open or completely open position, said first circuit including a switch controlling said first electrical motor and located in said truck cab.

The full nature of the invention will be understood from the accompanying drawings and the following description and claims.

FIG. 1 is a side elevation of a truck incorporating said spreading apparatus and embodying the present invention.

FIG. 2 is a side elevation of the structure of FIG. 1 with portions broken away for clarity and to illustrate the internal construction of certain portions of the structure.

FIG. 3 is a fragmentary end elevation of the structure illustrated in FIG. 2.

FIG. 4 is an enlarged section taken along the line 4—4 of FIG. 2 in the direction of the arrows.

FIG. 5 is a schematic diagram of an electrical circuit for the present invention.

FIG. 6 is a fragmentary illustration of a further electrical circuit forming an alternative embodiment of the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to FIG. 1, there is illustrated a truck 10 having a seed hopper 11 mounted on the rear end thereof. Any suitable seed hopper may be used with one example being the Model No. G3B953 of Garber Seeders, Inc., St. Paris, Ohio. The lower end of the hopper 11 tapers at 12 to an opening 13 which is controlled by a valve plate 15 reciprocably received within a slot 16 in the side wall of the vertical portion 17. If desired, suitable means may be provided for reciprocating the plate 15 from side to side during the operation of the present device for the purpose of preventing clogging of the opening 13. Such side to side reciprocation means is, however, not essential to the present invention.

A lever 20 is integral with a shaft 21 which is rotatably mounted within hinge type pivot bearings 22 fixed to the hopper 11. In the present embodiment, the lever 20 comprises a perpendicularly deformed end of the shaft 21. In conventional use of the seed hopper 11, the hand lever 24 fixed to the shaft 21 may be used to open and close the opening 13 for dispensing seed. In the present invention, however, the hand lever 25 is used only as a portion of means for limiting the movement of the valve plate 15.

Adjustably fixed to the shaft 21 is a sector 25 having gear teeth 26 at its external periphery. A gear reduction system or transmission 27 is fixed to the hopper 11 and couples a reversible electrical motor 30 to the gear teeth 26, the reversible electrical motor being fixed to the wall of the hopper 11. The gear reduction system or transmission 27 includes a worm 28 fixed to the shaft of the motor 30, said worm meshing with a spur gear 29 which is fixed to a shaft 33 upon which is fixed spur gear 34 which meshes with the teeth 26.

Referring to FIG. 5, the electrical diagram of the present invention is illustrated. The circuit includes a pair of lines 31 and 32 which lead to the reversible electrical motor 30 and which may be alternatively supplied with electricity to turn the motor 30 in opposite directions. In the lines 31 and 32, there are provided limit switches 35 and 36. When the limit switch 35 is opened by a projecting portion 23 of the arm 24, the motor 30 is de-energized so that further movement of the closure plate 15 in a direction unblocking the opening 13 is prevented. On the other hand, when the limit switch 36 is opened by engagement of the arm 25, the motor 30 is deenergized and thus prevented against further movement of the closure plate 15 in a closed direction or leftwardly as viewed in FIG. 2.

The position of the limit switch 35 can be adjusted by releasing the screw 40 and moving the limit switch 35 leftwardly or rightwardly as viewed in FIG. 2. The limit switch 35 and the limit switch 36 are mounted on the hopper 11 by means of a bar 41 the ends of which are fixed at 42 and 43 to the hopper and the major portion of which is fixed in spaced parallel relation to the side of the hopper 11. There is also provided a further bar 45 which is fixed directly to the wall of the hopper 11 and provides a bearing surface for the washer plate 46 through which the screw 40 extends. The limit switch 36 is also provided with a screw 47 and washer plate 50 which functions in similar fashion to the members 40 and 46.

Referring again to FIG. 5, the circuit of the present invention further includes a ground connection 55 for the motor 30. The circuit to the battery 56 of the truck for the motor 30 may be made through the ground connection 57 of the battery, the line 60, the line 61 and through double throw single pole switch 62. The switch 62 incorporates spring means 65 which normally maintain the switch arm 66 in an open position but which may be overcome by finger pressure to cause the switch arm 66 to engage the contact 67 or the contact 70. The line 71 and the line 72 lead from the contacts 67 and 70, respectively, to female receptacles 75 of a jack 76. The jack 76 may be plugged into by the plug members 80 which are connected to the lines 31 and 32 leading to the motor 30.

The switch 62 may be a conventional power window switch and may be operated to cause the motor 30 to unblock the opening 13 by engaging the switch arm 66 with the contact 67. When the switch arm 66 is moved into engagement with the contact 67, the motor 30 is energized through the grounds 55 and 57, battery 56, lines 60 and 61, switch arm 66, lines 71 and 31 and switch 35. As long as the switch contacts 66 and 67 are held engaged, the motor 30 will operate to unblock the opening or to move the plate 15 rightwardly until the switch 35 is engaged. Such engagement opens the contacts of the switch 35, stopping the motor 30.

It will be understood that the limit switches 35 and 36 being conventional incorporate spring means (not shown) which normally retain the switches 35 and 36 closed. An opposite operation to that above described, i.e., moving of the switch arm 66 into engagement with the contact 70 will cause the motor to move the plate 15 toward a position closing or blocking the opening 13. Such movement ceases when the switch 36 is engaged by the arm 24. It can, therefore, be appreciated that adjustment of the position of the switches 35 and 36 adjusts the amount of movement of the plate 15 upon actuation of switch 62. The position of the switches 35 and 36 can be easily adjusted by screws 40 and 47 and associated structure described above.

The circuit of FIG. 5 further includes a switch 79 also located within the cab of the truck alongside the switch 62. The switch 79 may be closed to complete the circuit to a motor 81 which is fixedly mounted below the seeder opening 13 and which has a drive shaft projecting upwardly and mounting a horizontal plate 82 having on its upper surface a plurality of radially extending ribs 85. When the motor 81 is energized and operating, any seed dropping downwardly through the opening 13 is flung outwardly by the centrifugal action of the ribs 85.

The switch 79 can be closed to energize the motor 81 through a line 86 which leads to the female receptacle 87 also forming a part of the jack 76. The plug 90 is formed on the end of the line 91 which leads to the motor 81. The motor 81 is grounded at 92 to the seeder and to the frame of the truck. The jack 76 may be located in any convenient position adjacent the seeder or hopper 11 and at the rear of the truck 10.

The above described preferred embodiment makes possible the operation of the motor 81 when the opening 13 is closed. Thus, the motor 81 can be started or maintained running when the truck reaches the end of a row and is being turned around in order to sow a further row of seed. The embodiment disclosed in FIG. 6, however, automatically shuts off the motor 81 whenever the closure plate 15 is closing off the opening 13 and the hand lever 25 is engaging the limit switch 36'. The embodiment of FIG. 6 is identical to the embodiment of FIG. 5 with the exception that the line 91 is replaced by a line 95 which leads into the switch 36' and a line 96 which leads away from the switch 36' and to the motor 81'. In all other respects, the embodiment of FIG. 6 is identical to that above described.

It will be evident from the above description that the present invention provides apparatus for spreading seed as rapidly as possible without waste of seed. Because of the fact that a part of applicant's combination includes the truck 10, the truck can be driven from field to field upon roads at full highway speeds and there is no restriction to the usual tractor speeds. Furtherfore, the truck 10 can be driven in the field usually at greater speeds than are possible with a tractor. The fact that the seeder can be remotely controlled within the cab of the truck by the truck driver makes possible the elimination of an extra man which might be required to operate the seeder were the remote control means not provided.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. Seed spreader apparatus comprising a hopper having a lower opening, a plate mounted on said hopper and reciprocal to open and close said opening, a hand lever swingably mounted on said hopper and coupled to said plate to open and close said opening, a reversible electrical motor fixed to said hopper, means operatively connecting said motor and said plate for blocking and unblocking of said opening, a pair of limit switches fixed to said hopper on opposite sides of said hand lever with the actuating arms of the limit switches facing toward said hand lever for engagement by said hand lever at the opposite ends of its travel, a circuit for operating said electric motor, a double throw single pole switch in said circuit, spring means normally maintaining said switch between said throws, a pair of lines connecting said reversible motor and said switch whereby said switch may be closed against one throw or the other to operate said reversible motor in one direction or the other, said limit switches each controlling a respective one of said lines to limit travel of said plate to a desired closed or open position.

2. Seed spreader apparatus comprising a hopper adapted to be mounted on a truck, a first electrical motor fixed to said hopper, a first plate mounted on the shaft of said motor in a horizontal position with radially extending ribs on the upper surface thereof, said hopper having a lower opening positioned above said first plate, a second plate mounted on said hopper and reciprocal to open and close said opening, a shaft rotatably mounted on said hopper, a lever fixed to said shaft and operatively engaging said second plate for reciprocation thereof, a hand lever fixed to said shaft and swingable to pivot said shaft for reciprocation of said second plate to open or close said opening, a second reversible electrical motor fixed to said hopper, a sector-shaped element fixed at its axis to said shaft, said sector-shaped element having gear teeth at its external periphery, speed reduction gearing coupling said motor and said gear teeth for pivoting said shaft at a reduced speed relative to said motor, a bracket bar fixed in spaced relation to the side wall of said hopper and overlying said hand lever, a pair of limit switches positioned on opposite sides of said hand lever with the actuating arms of the limit switches facing toward said hand lever for engagement by said hand lever at the opposite ends of it is travel, said switches each being adjustably fixed against said bracket bar and hopper by a screw extending between said bar and hopper, a first circuit for operating said first electric motor, a second circuit for operating said second electric motor, a double throw single pole switch in said second circuit, spring means normally maintaining said switch between said throws, a pair of lines connecting said reversbile motor and said switch whereby said switch may be closed against one throw or the other to operate said reversible motor in one direction or the other, said limit switches each controlling a respective one of said lines to limit travel of said second plate to a desired closed, partially open or completely open position, said first circuit including a switch controlling said first electrical motor.

3. Seed spreader apparatus comprising a truck, a hopper moutned on said truck, said hopper having a lower opening, a plate mounted on said hopper and reciprocal to open and close said opening, a shaft rotatably mounted on said hopper, a lever fixed to said shaft and operatively engaging said plate for reciprocation thereof, a hand lever fixed to said shaft and swingable to pivot said shaft for reciprocation of said plate to open or close said opening, a reversible electrical motor fixed to said hopper, a sector-shaped element fixed at its axis to said shaft, said sector-shaped element having gear teeth at its external periphery, speed reduction gearing coupling said motor and said gear teeth for pivoting said shaft at a reduced speed relative to said motor, a bracket bar fixed in spaced relation to the side wall of said hopper and overlying said hand lever, a pair of limit switches positioned on opposite sides of said hand lever with the actuating arms of the limit switches facing toward said hand lever for engagement by said hand lever at the opposite ends of its travel, said switches each being adjustably fixed against said bracket bar and hopper by a screw extending between said bar and hopper, a circuit for operating said electrical motor, a double throw single pole switch in said circuit and located in the cab of said truck, spring means normally maintaining said switch between said throws, a pair of lines connecting said reversible motor and said switch whereby said switch may be closed against one throw or the other to operate said reversible motor in one direction or the other, said limit switches each controlling a respective one of said lines to limit travel of said second plate to a desired closed, partially open or completely open position.

4. Seed spreader apparatus comprising a truck, a hopper mounted on said truck, a first electrical motor fixed to said hopper, a first plate mounted on the shaft of said motor in a horizontal position with radially extending ribs on the upper surface thereof, said hopper having a lower opening positioned above said first plate, a second plate mounted on said hopper and reciprocal to open and close said opening, a shaft rotatably mounted on said hopper, a lever fixed to said shaft and operatively engaging said second plate for reciprocation thereof, a hand lever fixed to said shaft and swingable to pivot said shaft for reciprocation of said second plate to open or close said opening, a second reversible electrical motor fixed to said hopper, a sector-shaped element fixed at its axis to said shaft, said sector-shaped element having gear teeth at its external periphery, speed reduction gearing coupling said motor and said gear teeth for pivoting said shaft at a reduced speed relative to said motor, a bracket bar fixed in spaced relation to the side wall of said hopper and overlying said hand lever, a pair of limit switches fixed to said hopper on opposite sides of said hand lever with the actuating arms of the limit switches facing toward said hand lever for engagement by said hand lever at the opposite ends of its travel, a first circuit for operating said first electric motor, a second circuit for operating said second electric motor, a double throw single pole switch in said second circuit and located in the cab of said truck, spring means normally maintaining said switch between said throws, a pair of lines connecting said reversible motor and said switch whereby said switch may be closed against one throw or the other to operate said reversible motor in one direction or the other, said limit switches each controlling a respective one of said lines to limit travel of said second plate to a desired closed, partially open or completely open position, said first circuit including a switch controlling said first electrical motor and located in said truck cab.

5. Seed spreader apparatus comprising a truck, a hopper mounted on said truck, a first electrical motor fixed to said hopper, a first plate mounted on the shaft of said motor in a horizontal position with radially extending ribs on the upper surface thereof, said hopper having a lower opening positioned above said first plate, a second plate mounted on said hopper and reciprocal to open and close said opening, a shaft rotatably mounted on said hopper, a lever fixed to said shaft and operatively engaging said second plate for reciprocation thereof, a hand lever fixed to said shaft and swingable to pivot said shaft for reciprocation of said second plate to open or close said opening, a second reversible electrical motor fixed to said hopper, a sector-shaped element fixed at its axis to said shaft, said sector shaped element having gear teeth at its external periphery, speed reduction gearing coupling said motor and said gear teeth for pivoting said shaft at a reduced speed relative to said motor, a bracket bar fixed in spaced relation to the side wall of said hopper and overlying said hand lever, a pair of limit switches positioned on opposite sides of said hand lever with the actuating arms of the limit switches facing toward said hand lever for engagement by said hand lever at the opposite ends of its travel, said switches each being adjustably fixed against said bracket bar and hopper by a screw extending between said bar and hopper, a first circuit for operating said first electrical motor, a second circuit for operating said second electrical motor, a double throw single pole switch in said second circuit and located in the cab of said truck, spring means normally maintaining said switch between said throws, a pair of lines connecting said reversible motor and said switch whereby said switch may be closed against one throw or the other to operate said reversible motor in one direction or the other, said limit switches each controlling a respective one of said lines to limit travel of said second plate to a desired closed, partially open or completely open position, said first circuit including a switch controlling said first electrical motor and located in said truck cab, said first circuit being coupled to said first electrical motor through the one of said limit switches which limits travel of said second plate into closed position.

No references cited.

LOUIS J. DEMBO, *Primary Examiner.*